United States Patent
Jeon et al.

(10) Patent No.: US 10,926,204 B2
(45) Date of Patent: Feb. 23, 2021

(54) PURIFICATION DEVICE

(71) Applicant: LG ELECTRONICS INC., Seoul (KR)

(72) Inventors: Jewook Jeon, Seoul (KR); Hoon Jang, Seoul (KR); Minho Kim, Seoul (KR); Youngseok Kim, Seoul (KR); Soonki Jung, Seoul (KR); Jingyu Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 16/114,915

(22) Filed: Aug. 28, 2018

(65) Prior Publication Data

US 2019/0060801 A1 Feb. 28, 2019

(30) Foreign Application Priority Data

Aug. 30, 2017 (KR) .................. 10-2017-0110414

(51) Int. Cl.
*B01D 35/04* (2006.01)
*B01D 35/30* (2006.01)
(Continued)

(52) U.S. Cl.
CPC ......... *B01D 35/04* (2013.01); *B01D 35/1573* (2013.01); *B01D 35/18* (2013.01);
(Continued)

(58) Field of Classification Search
CPC .... B01D 2201/0415; B01D 2201/0423; B01D 2201/301; B01D 35/04; B01D 35/18;
(Continued)

(56) References Cited

U.S. PATENT DOCUMENTS 3,985,272 A * 10/1976 Rodth .................. B67D 3/0012
222/205
2007/0017376 A1 1/2007 Oehninger
(Continued)

FOREIGN PATENT DOCUMENTS

AU 2017423559 2/2019
AU 2018220139 3/2019
(Continued)

OTHER PUBLICATIONS

Korean Office Action dated Oct. 10, 2019 issued in KR Application No. 10-2019-0089180.
(Continued)

*Primary Examiner* — Dirk R Bass
(74) *Attorney, Agent, or Firm* — KED & Associates, LLP

(57) ABSTRACT

A purification device comprises a main body; and a water-outlet module formed to protrude forward of the main body, wherein the water-outlet module includes a water-outlet nozzle for supplying water passing through the filter out of the main body, wherein the water-outlet module includes: a casing, wherein at least a portion of the water-outlet nozzle is mounted on a bottom of the casing so as to be exposed to an outside; a water-supply hose, wherein one end thereof is connected to an inside of the main body while the other end thereof is provided inside the casing and is connected to the water-outlet nozzle, such water from the main body is supplied to the water-outlet nozzle; and a valve provided within the casing, wherein the valve is provided above the water-discharge nozzle and is installed on the water-supply hose to control a flow of water through the water-supply hose.

18 Claims, 10 Drawing Sheets

(51) Int. Cl.
  *B01D 35/18* (2006.01)
  *C02F 1/00* (2006.01)
  *B01D 35/157* (2006.01)
(52) U.S. Cl.
  CPC ........... *B01D 35/30* (2013.01); *B01D 35/303* (2013.01); *C02F 1/002* (2013.01); *C02F 1/003* (2013.01); *B01D 2201/0415* (2013.01); *B01D 2201/302* (2013.01); *C02F 2201/002* (2013.01); *C02F 2307/10* (2013.01)
(58) Field of Classification Search
  CPC .. B01D 35/303; C02F 1/003; C02F 2201/004; C02F 2201/005; C02F 2201/007
  See application file for complete search history.

(56) References Cited

U.S. PATENT DOCUMENTS

| | | | |
|---|---|---|---|
| 2014/0251498 | A1 | 9/2014 | Park et al. |
| 2017/0050836 | A1 | 2/2017 | Yoon |
| 2017/0153056 | A1* | 6/2017 | Kim .................. B01D 35/1435 |
| 2019/0060803 | A1 | 2/2019 | Jeon et al. |

FOREIGN PATENT DOCUMENTS

| | | |
|---|---|---|
| DE | 29810291 | 9/1998 |
| JP | 2008-168237 | 7/2008 |
| KR | 10-0650666 | 11/2006 |
| KR | 10-2007-0115097 | 12/2007 |
| KR | 10-2010-0054580 | 5/2010 |
| KR | 10-1338670 | 12/2013 |
| KR | 10-1381803 | 4/2014 |
| KR | 10-2015-0004669 | 1/2015 |
| KR | 10-2017-0063454 | 6/2017 |

OTHER PUBLICATIONS

United States Office Action dated Mar. 30, 2020 issued in U.S. Appl. No. 16/114,709.
Korean Notice of Allowance dated Nov. 13, 2018 issued in Application No. 10-2017-0110414.
Australian Office Action dated May 3, 2019 issued in AU Application No. 2018222909.
U.S. Appl. No. 16/114,767, filed Aug. 28, 2018.
U.S. Appl. No. 16/110,252, filed Aug. 23, 2018.
U.S. Appl. No. 16/114,827, filed Aug. 28, 2018.
U.S. Appl. No. 16/114,915, filed Aug. 28, 2018.
U.S. Appl. No. 16/114,709, filed Aug. 28, 2018.
United States Office Action dated Apr. 7, 2020 issued in U.S. Appl. No. 16/114,827.
Korean Office Action dated Jul. 20, 2018 issued in KR Application No. 10-2017-0110412.
Korean Office Action dated Jul. 20, 2018 issued in KR Application No. 10-2017-0107574.
Korean Office Action dated Jul. 20, 2018 issued in KR Application No. 10-2017-0108888.

* cited by examiner

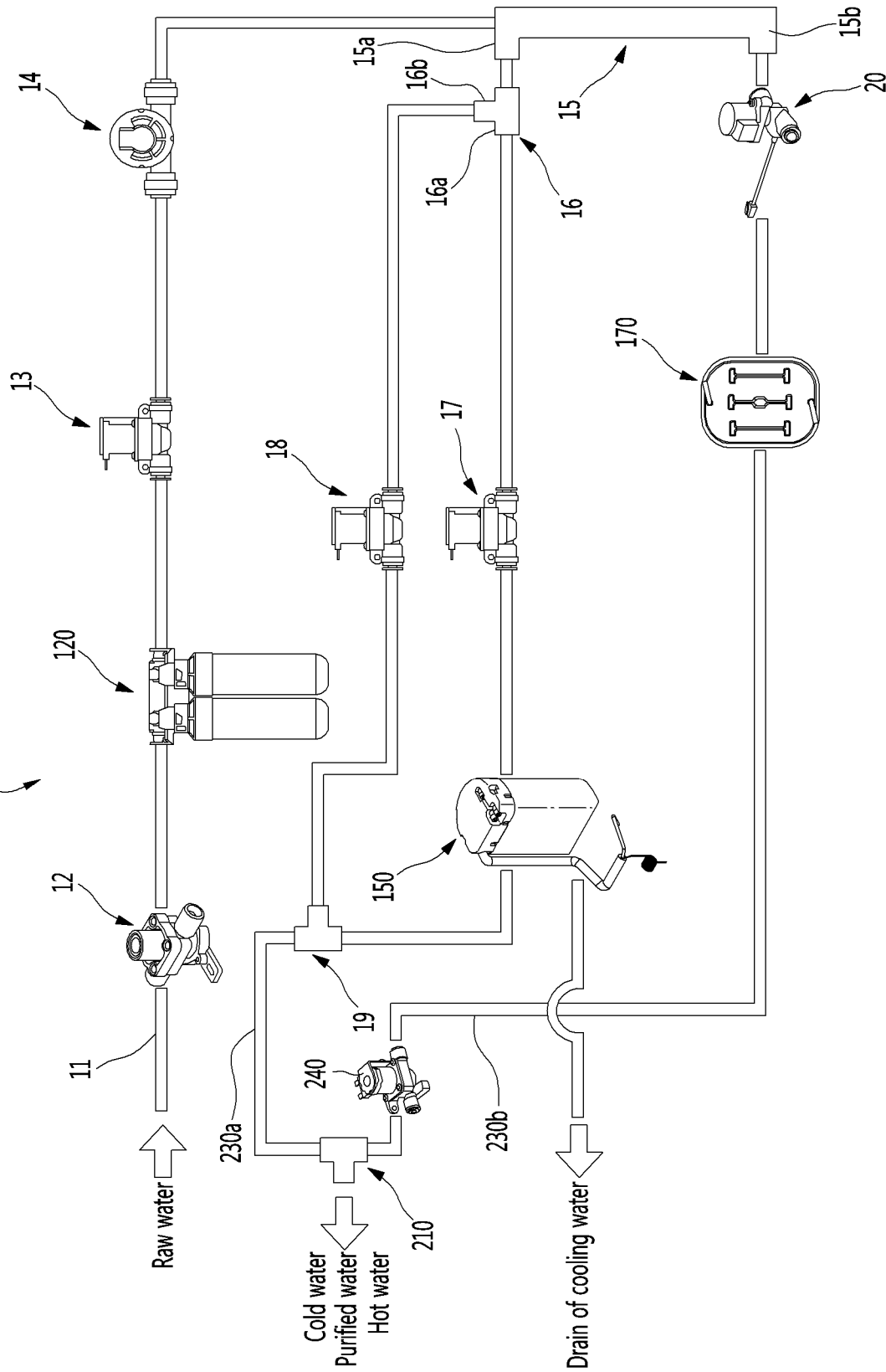

PURIFICATION DEVICE

CROSS-REFERENCE TO RELATED APPLICATIONS

This application claims priority under 35 U.S.C. § 119 to Korean Patent Application No. 10-2017-0110414 filed on Aug. 30, 2017, whose entire disclosure is hereby incorporated by reference. This application is related to U.S. application Ser. No. 16/114,767, filed Aug. 28, 2018, U.S. application Ser. No. 16/110,252, filed Aug. 23, 2018, U.S. application Ser. No. 16/114,827, filed Aug. 28, 2018, and U.S. application Ser. No. 16/114,709, filed Aug. 28, 2018, whose disclosures are also incorporated by reference.

BACKGROUND

1. Field

The present disclosure relates to a purification device.

2. Background

Generally, a purification device filters water to remove impurities therefrom and is widely used in the home. Specifically, the purification device may be connected to a tap water supply and may remove floating or harmful components contained in tap water using a filter. The purification device may be configured to discharge a desired amount of water by manipulation of a user.

Nowadays, a variety of the above-described purification devices having water purification function and discharge function of hot water and cold water are being introduced. In recent years, the purification device has been developed which may be small and thus installed in various installation environment.

The purification device as described above has a water-discharge valve. In a standby mode, when a water discharge request is input by the user, the water-discharge valve is opened, such that the purified water, cold water, or hot water which has passed through the water-discharge valve is supplied to the water-outlet nozzle. The water-discharge valve is then closed. Conventionally, the water-discharge valve for controlling the discharge of purified water, cold water, and hot water has been installed inside a main body of the purification device.

As a result, a distance between the water-discharge valve and the water-outlet nozzle increases. Thus, the length of the water flow channel from the water-discharge valve to the water-outlet nozzle had to be larger. Moreover, as the length of the water flow channel becomes longer, water is supplied to the water-outlet nozzle in a longer period of time after a water-discharge request from the user, so that immediate water supply is not achieved.

In addition, in the case of hot water, the length of the hot water flow channel between the hot water valve and the water-outlet nozzle is inevitably increased. Thus, while the hot water flows from the hot water valve to the water-outlet nozzle, the temperature of the hot water is lowered. Similarly, in the case of cold water, the length of the cold water flow channel between the cold water valve and the water-outlet nozzle is inevitably larger. Thus, while the cold water flows from the cold water valve to the water-outlet nozzle, the temperature of the cold water rises up. Consequently, the user may not receive the hot water or cold water immediately.

BRIEF DESCRIPTION OF THE DRAWINGS

The embodiments will be described in detail with reference to the following drawings in which like reference numerals refer to like elements wherein:

FIG. 10 is a schematic view of a flow path of water in the purification device.

DETAILED DESCRIPTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 1:
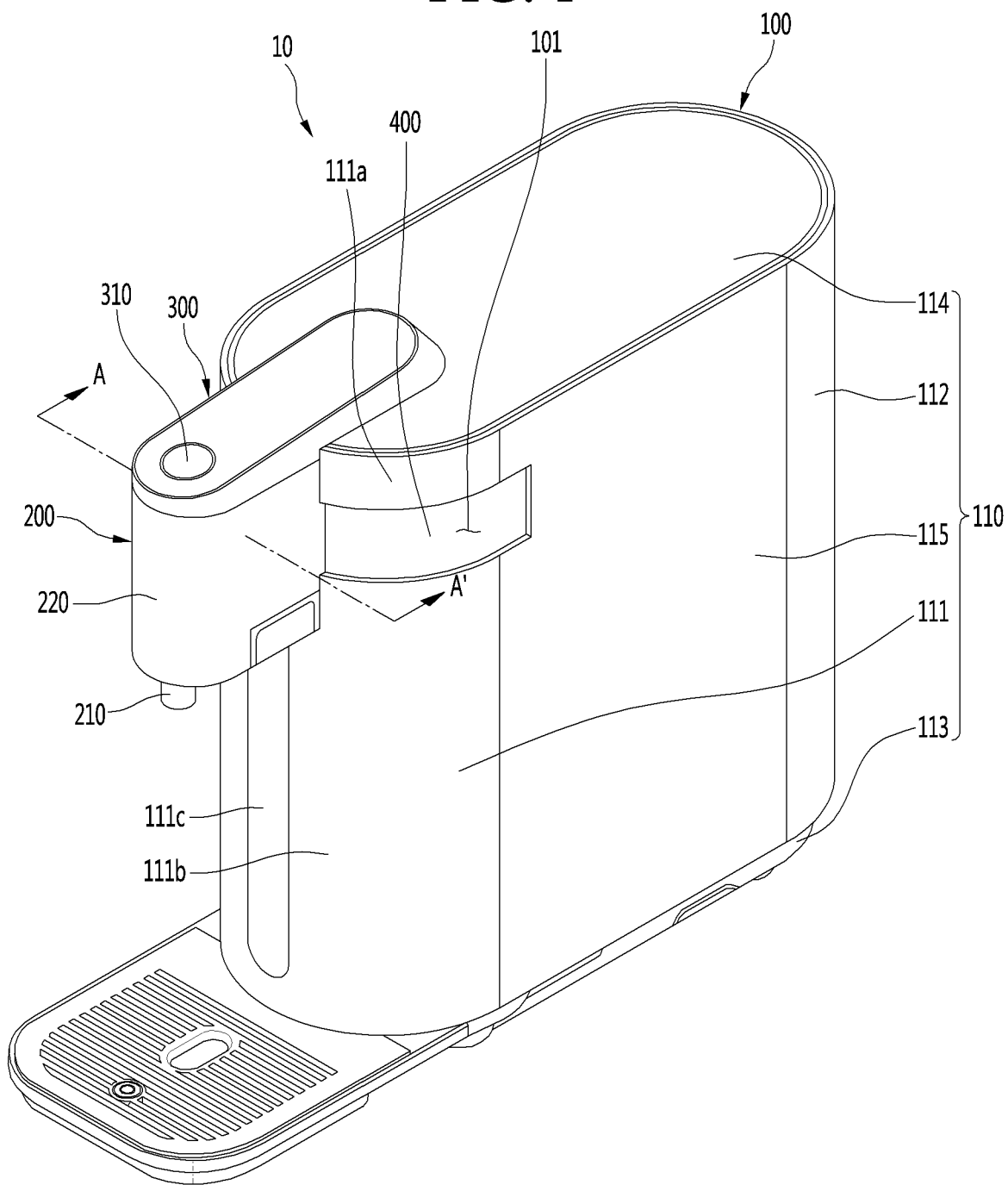
FIG. 1 is a perspective view of a purification device according to one embodiment of the present disclosure.
Figure 2:
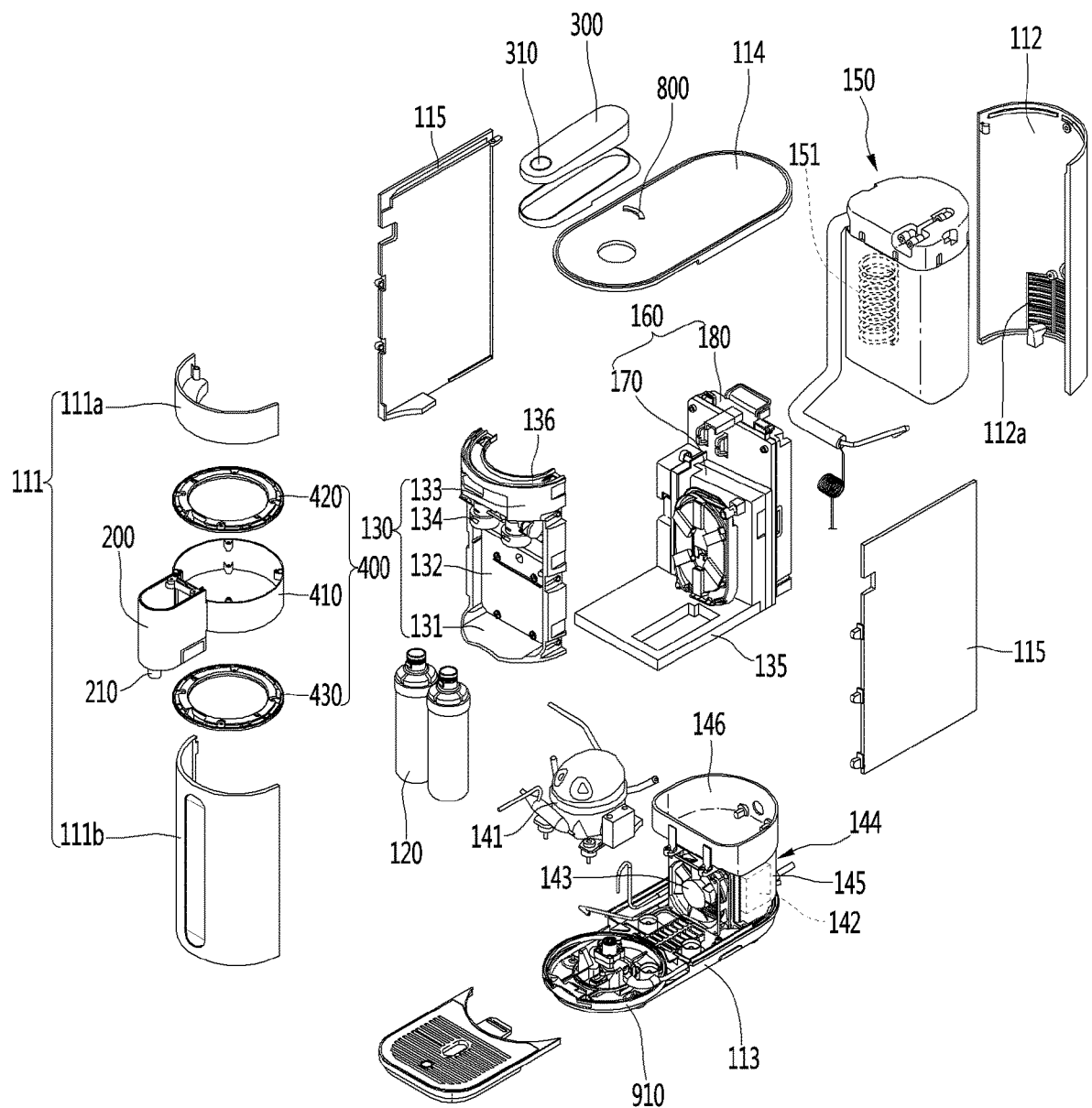
FIG. 2 is an exploded perspective view of the above purification device.

FIG. 1 is a perspective view of a purification device according to one embodiment of the present disclosure. FIG. 2 is an exploded perspective view of the above purification device. Referring to FIG. 1 and FIG. 2, the purification device 10 according to one embodiment of the present disclosure may include a main body 100 including a housing 110 defining an appearance of the device, and a filter 120 installed inside the housing 110 to filter raw-water introduced from the outside; and a water-outlet module 200 formed to protrude forward of the main body 100, wherein the module 200 includes a water-outlet nozzle 210 for supplying water passing through the filter 120 to the outside of the main body 100.

The external appearance of the purification device 10 may be defined by the housing 110. The housing 110 may include a front-cover 111 defining the appearance of the front-face, a rear-cover 112 defining the appearance of the rear-face, a base 113 defining the bottom face, a top-cover defining the top face 114, and left and right side-panels 115 defining both lateral faces. The front-cover 111, the rear-cover 112, the base 113, the top-cover 114 and a pair of the side-panels 115 may be assembled together to define the housing 110 forming the appearance of the purification device 10.

In this connection, the front end and the rear end of each of the base 113 and the top-cover 114 may be rounded. Thus, each of the front-cover 111 and the rear-cover 112 may be convexly formed forwardly and rearwardly, respectively so as to have a curvature corresponding to a curvature of the front end and the rear end of each of the base 113 and the top-cover 114. On the front face of the main body 100, the water-outlet module 200 is provided. The water-outlet module 200 is provided so as to protrude forward from the front face of the main body. The purified water may be discharged through a water-outlet nozzle 210 protruding downward.

A more detailed example of the water-outlet module 200 will be described later. The housing 110 includes a filter 120 for purification of water and a filter bracket 130 to which a plurality of valves (not shown) are mounted. The filter bracket 130 may include a bottom portion 131 coupled with the base 113, and a filter receiving portion 132 in which the filter 120 is received.

The shape of the bottom portion 131 may be formed to correspond to the shape of the tip of the base 113, and the portion 131 may be coupled to the base 113. Thus, the mounting position of the filter bracket 130 may be fixed via the coupling between the bottom portion 131 and the base 113. Further, the bottom face shape of the filter receiving portion 132 may be defined. The filter bracket 130 may be hooked to the base 113 in a hook manner. The filter bracket 130 may be fixed by a screw fastened to the bottom face of the base 113.

The filter receiving portion 132 extends in the vertical direction. The filter receiving portion 132 has a recessed space defined therein from a front side (left side in the figure) to a rear side (right side in the figure) so that the filter 120 may be accommodated therein. A plurality of the filters 120 may be mounted in the filter receiving portion 132. The filter 120 may include a combination of the filters having various functions and may be configured for purifying raw-water (tap water) to be supplied thereto.

Further, the filter receiving portion 132 may further include a filter socket 134 on which the filter 120 is mounted. The filter socket 134 is provided with piping for flowing purified water. The piping may be connected to a plurality of valves (not shown). Thus, the raw-water may pass through the filter 120 in turn and then to a water valve (not shown).

A plurality of valves (not shown) may be provided on the back face (right side in the drawing) of the filter receiving portion 132. The valves (not shown) may supply purified water having passed through the filter 120 to a cooling tank 150 for generating cold water or an induction heating assembly 170 for generating hot water. Furthermore, purified water may be supplied to the water-outlet module 200 immediately.

Further, the manipulation unit (or handle) 300 may be provided above the water-outlet module 200. In one embodiment, a compressor 113 and a condenser 142 are provided on the top face of the base 113. In addition, a cooling fan 143 is provided between the compressor 141 and the condenser 142 to realize cooling of the compressor 141 and the condenser 142. The compressor 141 may include the compressor of the inverter type capable of adjusting the cooling ability by varying the frequency. Therefore, the cooling of purified water may be efficiently performed, thereby reducing power consumption.

Further, the condenser 142 may be located behind the base 113 and may be located at a position corresponding to a discharge hole 112*a* defined in the rear-cover 112. The condenser 142 may be realized by bending the flat tube type refrigerant tube many times in order to efficiently utilize the space and at the same time to improve the heat exchange efficiency. The condenser may be configured to be received within the condenser bracket 144.

The condenser bracket 144 may have a condenser mount 145 on which the condenser 142 may be fixed, and a tank mount 146 on which a cooling tank 150 for producing cold water may be mounted. The condenser mount 145 has a space defined therein having a shape corresponding to the overall shape of the condenser 142 so as to accommodate the condenser 142. Further, portions of the condenser mount 145 facing the cooling fan 143 and the discharge hole 112*a* are opened, respectively, whereby effective cooling of the condenser 142 is possible.

Further, the tank mount 146 is formed on the condenser bracket 144, that is, on the condenser mount 145. The bottom portion of the cooling tank 150 is inserted into the tank mount 146 so that the tank mount 146 fixes the cooling tank 150. The cooling tank 150 may be configured to cool purified water to generate cold water, and, to this end, may be filled with cooling water for heat exchange with the purified water. Further, an evaporator 151 for cooling the cooling water may be accommodated in the cooling tank 150. Further, purified water may pass through the inside of the cooling tank to cool the purified water.

The support bracket 130 is further provided at one side thereof with a support plate 135 extending toward the cooling tank 150. The support plate 135 is provided on the compressor 141. The plate 135 extends from the filter bracket 130 to the condenser bracket 144 to provide a space for receiving the heating and control module 160.

The heating and control module 160 may include an induction heating assembly 170 for generating hot water and a control assembly 180 for controlling the overall operation of the purification device 10. The induction heating assembly 170 and the control assembly 180 may be coupled to each other to form a single module. The induction heating assembly 170 and the control assembly 180 may be mounted on the support plate 135 in the combined state into the single module.

The induction heating assembly 170 is configured to heat purified water and to operate in induction heating (IH) mode. The induction heating assembly 170 may heat the water immediately and rapidly at the time of manipulation for hot water discharge. The heating assembly controls the output of the magnetic field so that purified water may be heated to a target temperature and supplied to a user. Thus, depending on the user's manipulation, the hot water at the target temperature may be discharged.

The control assembly 180 may be configured to control the operation of the purification device 10. The assembly 180 may be configured to control the compressor 141, the cooling fan 143, various valves and sensors, the induction heating assembly 170, and the like. The control assembly 180 may be configured as a module by a combination of PCBs (printed circuit boards) divided into a plurality of functional parts. In addition, when the purification device 10 discharges only cold water and purified water, a PCB for controlling the induction heating assembly 170 may be omitted. In this manner, the at least one PCB may be omitted.

Figure 3:
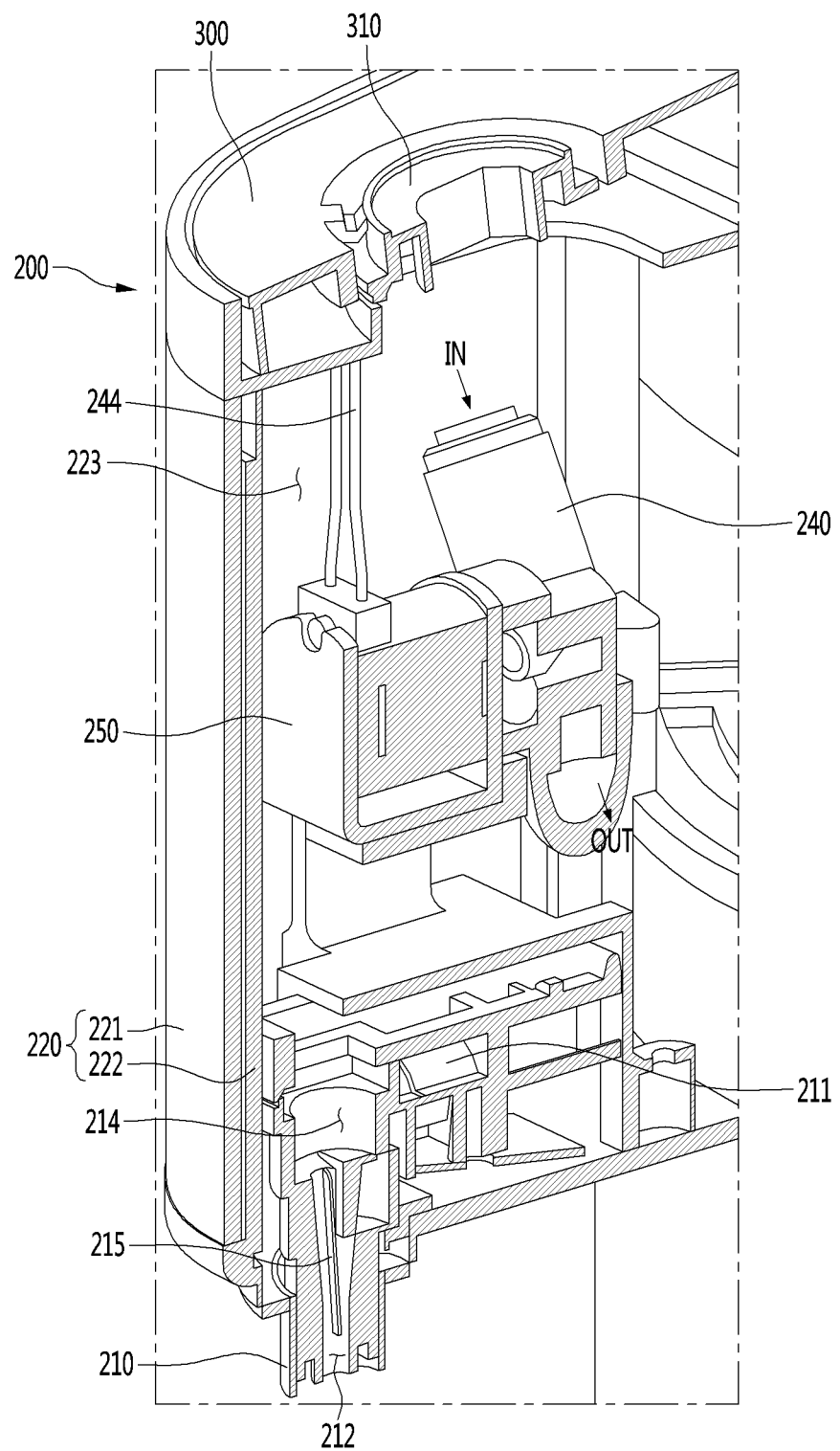
FIG. 3 is a partial cutaway perspective view of a water-outlet module as one component of the present disclosure.
Figure 4:
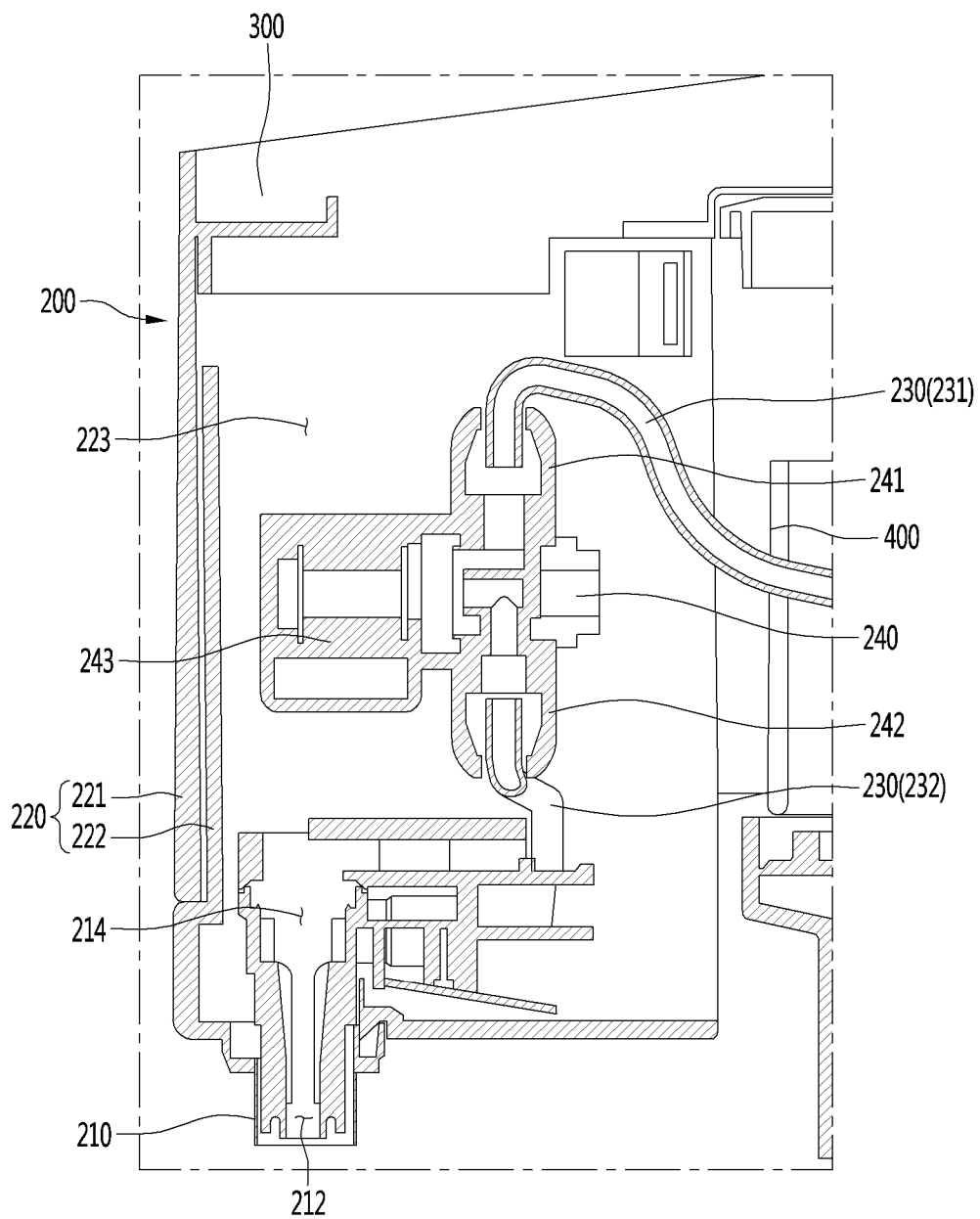
FIG. 4 is a vertical cross-sectional view of the water-outlet module as one component of the present disclosure.
Figure 5:
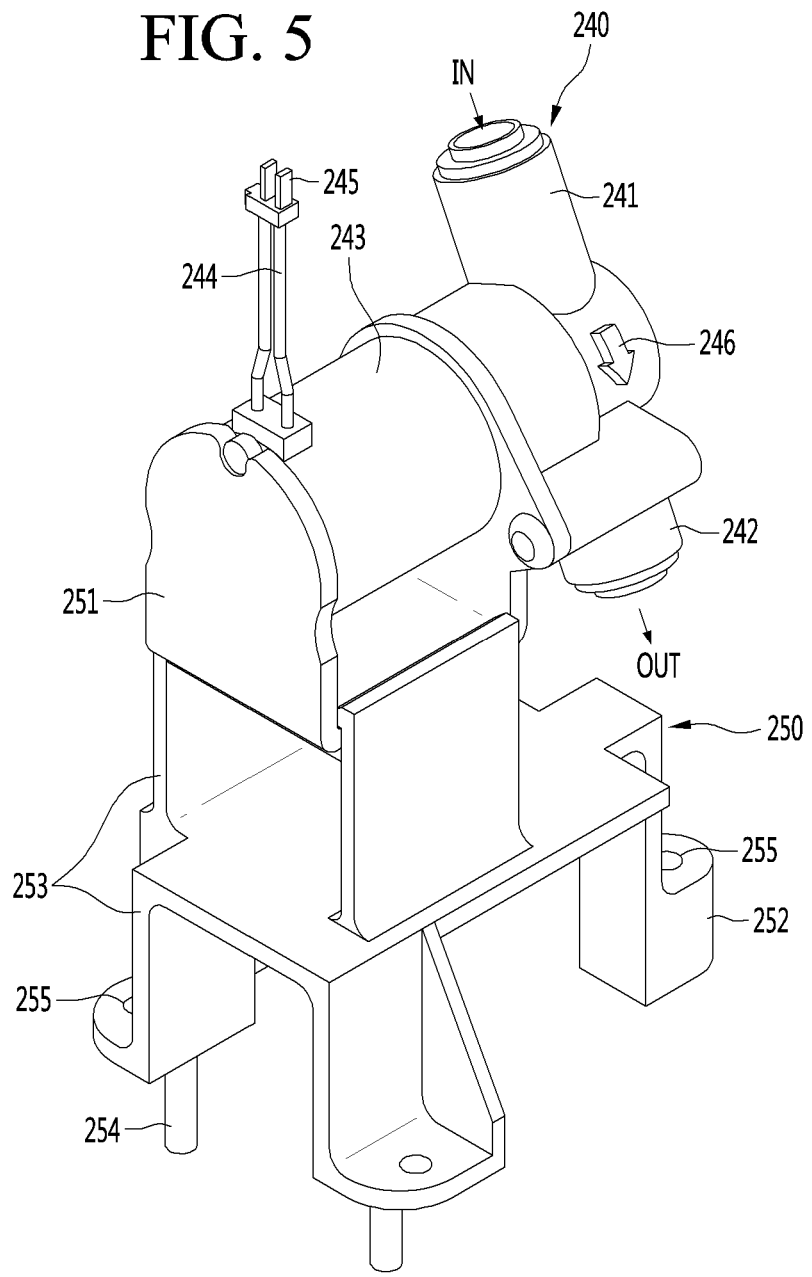
FIG. 5 is a perspective view showing an assembled state between a valve and a bracket as components of the present disclosure.

Hereinafter, the water-outlet module, which is a main component of the present disclosure, is illustrated more specifically. FIG. 3 is a partial cutaway perspective view of a water-outlet module as one component of the present disclosure. FIG. 4 is a vertical cross-sectional view of the water-outlet module as one component of the present disclosure. FIG. 5 is a perspective view showing an assembled state between a valve and a bracket as components of the present disclosure.

Referring to FIG. 3 to FIG. 5, the water-outlet module 200 may include a casing 220, a water-outlet nozzle 210, and a water-supply hose 230. At least a portion of the water-outlet nozzle 210 is mounted on the bottom of the casing 220 so as to be exposed to the outside. The casing 220 has a receiving space 223 defined therein. One end of the water-supply hose 230 is connected to the inside of the main body 100 while the other end thereof is connected to the water-outlet nozzle 210 inside the casing 220. Accordingly, at least one of purified water, hot water, and cold water as generated from the main body 100 may be supplied to the water-outlet nozzle 210. The water-outlet module 200 may further include a valve 240. The valve 240 may be provided within the casing 220 and may be provided above the water-discharge nozzle 210 and may be installed on the water-supply hose 230 to control the flow of water through the water-supply hose 230.

When the valve 240 for controlling the flow of water is mounted inside the casing 220, utilization of the receiving space 223 in the water-outlet module 200 may be increased. In addition, the internal space of the main body 100 may have a relatively larger room to spare compared to a case when the valve 240 is installed in the main body 100. Thus, the main body 100 may be downsized. Moreover, the water-outlet nozzle 210 may be closer to the valve 240. Thus, the discharge of the water supply of the purified water, hot water, cold water may be executed immediately.

Conventionally, a valve 240 is installed inside the main body 100. In this case, when the user requests the discharge of water, the valve 240 is opened, and, then, water is supplied from the valve 240 to the water-outlet nozzle 210. Therefore, in such a conventional case, upon the water discharge request from the user, the distance over which the water flows may be larger.

However, when, according to the present disclosure, the valve 240 is provided near the water-outlet nozzle 210, a path of the water flow between the valve 240 and the water-outlet nozzle 210 is significantly reduced. Thus, as the length of the water path is reduced, the supply of water may proceed more quickly.

In one embodiment, the water-supply hose 230 supplies at least one of purified water, hot water, and cold water generated from the main body 100 to the water-discharge nozzle 210. In one example, the water-supply hose 230 may serve as a purified water pipe for supplying purified water or cold water generated from the main body 100.

In another example, the water-supply hose 230 may serve as a hot water pipe for supplying hot water generated from the main body 100. In this case, the water-supply hose 230 may be connected to a hot water module (or water heater), one end of which is installed in the main body 100. The valve 240 may serve as a hot water valve for controlling the flow of hot water supplied from the hot water module to the water-discharge nozzle 210.

In this connection, the hot water module refers to a heating mechanism provided in the main body 100 for heating purified water to hot water. In one example, the hot water module may refer to the induction heating assembly 170. In this embodiment, the hot water valve 240 may be provided closer to the water-outlet nozzle 210. Thus, hot water discharge may be performed immediately.

Specifically, in the standby mode of the purification device, the water-supply hose 230 existing between the hot water valve 240 and the induction heating assembly 170 installed in the main body 100 has been already filled with hot water. In this state, when the user requests the discharge of hot water, the hot water valve 240 is opened, and, then, tot water is supplied to the water-outlet nozzle 210 provided closer to the hot water valve 240.

In this connection, since the hot water valve 240 is provided closer to the water-outlet nozzle 210, the hot water flow path between the hot water valve 240 and the water-outlet nozzle 210 can be significantly reduced. Thus, the hot water supply may be made faster in a corresponding manner to the reduced length.

In addition, since the hot water flow path between the hot water valve 240 and the water-outlet nozzle 210 is significantly reduced, the temperature of the hot water as discharged from the water-outlet nozzle 210 may be kept higher. In the conventional case, since the hot water valve 240 is installed in the main body 100, the hot water flow distance between the hot water valve 240 and the water-outlet nozzle 210 has to be larger. Thus, while the hot water flows from the hot water valve 240 to the water-outlet nozzle 210, the temperature of the hot water is lowered.

According to the present disclosure, the hot water valve 240 is installed in the water-outlet module 200 equipped with the water-discharge nozzle 210. Thus, when the hot water is discharged, the hot water flow distance is minimized, thereby minimizing the temperature loss of the hot water. As a result, the user can more rapidly discharge the hot water through the water-discharge nozzle 210, as compared to the conventional case.

In one embodiment, the valve 240 may include following components: a water-inlet portion (or inlet) 241 connected to the main body 100 for receiving at least one of purified water, hot water, and cold water; a water-exiting portion (or outlet) 242 connected to the water-outlet nozzle 210 for discharging water introduced through the water-inlet portion 241; and an actuation unit (or actuator) 243 provided between the water-inlet portion 241 and the water-exiting portion 242 to open and close a channel communicating between the water-inlet portion 241 and the water-exiting portion 242.

Accordingly, the actuation of the actuation unit 243 opens and closes the channel between the water-inlet portion 241 and the water-exiting portion 242. Correspondingly, water entering the water-inlet portion 241 may or may not be transferred to the water-exiting portion 242. In one example, the valve 240 may be implemented as a solenoid valve.

In addition, the water-supply hose 230 may include a first hose 231 for connecting the main body 100 and the water-inlet portion 241 of the valve 240, and a second hose 232 for connecting the water-outlet nozzle 210 and the water-exiting portion 242 of the valve 240 to each other. In this connection, the first hose 231 and the second hose 232 may each be made of a flexible material.

In addition, the first hose 231 may have an extra length for rotation and vertical movement of the water-outlet module 200 as described below. In one embodiment, the valve 240 may be oriented obliquely in the vertical direction. The first hose 231 may be connected to the top of the valve 240, while the second hose 232 may be connected to the bottom of the valve 240.

When, as described above, the valve 240 is oriented at an angle, the vertical length occupied by the valve 240 may be reduced. Thus, the valve may be easily installed in the inner space of the water-outlet module 200. In addition, the flow of water through the valve 240 may be stably achieved in the inclined direction.

Furthermore, the degree of bending of the first hose 231 and the second hose 232 connected to the valve 240 may be reduced. Thus, the flow of water from the first hose 231 to the valve 240 and the flow of water from the valve 240 to the second hose 232 may be achieved stably.

In one embodiment, an arrow 246 indicating the flow direction of the water may be displayed on the outer face of the valve 240. The arrow 246 may indicate the direction from the water-inlet portion 241 to the water-exiting portion 242. The operator may recognize the arrow 246 and correctly connect the first hose 231 and the second hose 232 without confusing the water-inlet portion 241 and the water-exiting portion 242 with each other.

In addition, when adjusting the inclination of the valve 240, the operator may refer to the arrow 246 to raise the water-inlet portion 241 and lower the water-exiting portion 242. That is, the workability and convenience of the operator may be improved.

Figure 6:
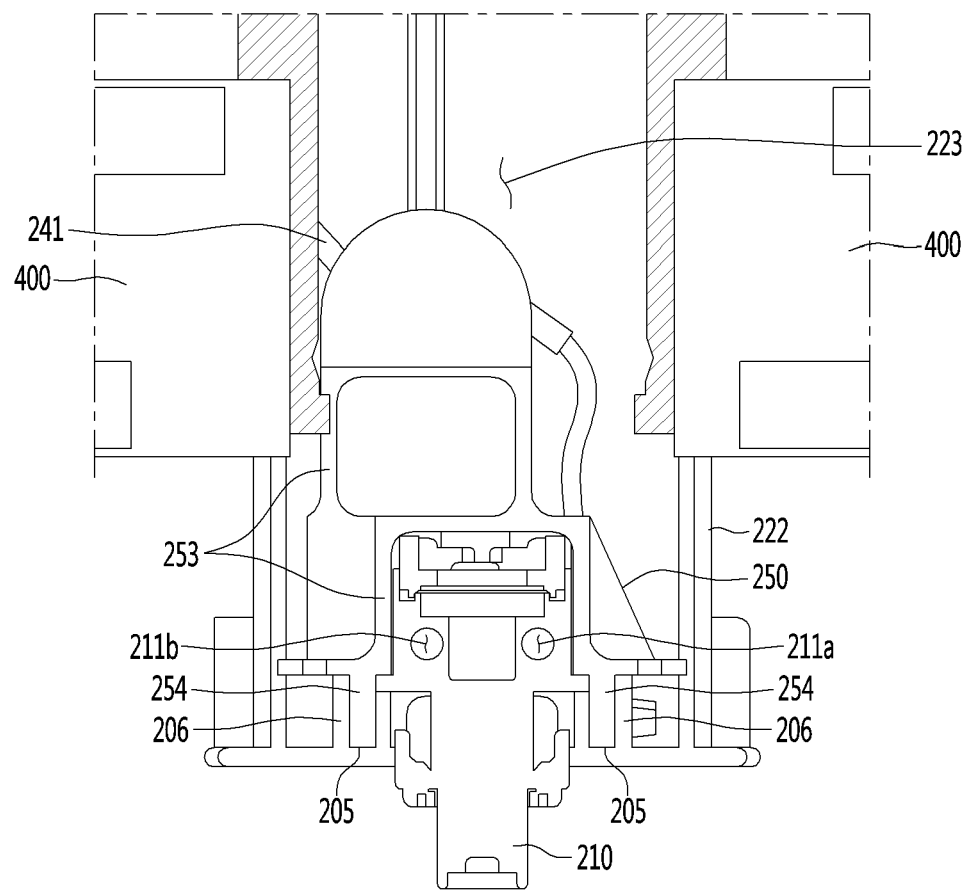
FIG. 6 is a front vertical cross-sectional view of the water-outlet module as one component of the present disclosure.

FIG. 6 is a front and vertical cross-sectional view of the water-outlet module as one component of the present disclosure. Referring to FIGS. 5 to 6, the water-outlet module 200 further includes a bracket 250 for fixing the valve 240 inside the water-outlet module 200.

The valve 240 may be directly fixed within the water-outlet module 200. Alternatively, the valve 240 may be secured within the water-outlet module 200 using the bracket 250. When the valve 240 is secured to the water-outlet module 200 using the bracket 250, the valve 240 is first assembled to the bracket 250, and then the bracket 250 having the assembled valve 240 therewith may be coupled to the water-outlet module 200. Alternatively, the bracket 250 may be first coupled to the water-outlet module 200, and, then, the valve 240 may be assembled to the bracket 250 coupled to the water-outlet module 200.

In one example, the bracket 250 includes a valve mount 251 on which the valve 240 is mounted, a fixed portion (or fixing frame) 252 provided on the bottom of the valve mount 251 and fixed to a lower level of the water-outlet module 200, and a spacer 253 provided between the valve mount 251 and the fixed portion 252 to define a space between the valve mount 251 and the fixed portion 252.

In the configuration of the bracket 250 as described above, the valve 240 may be provided above the nozzle 210 and apart from the top of the water-outlet nozzle 210. As described above, when the space is secured under the valve 240 via the spacer 253, the water-supply hose 230, etc. may be arranged in the space.

Furthermore, a separate supply pipe or the like bypassing the valve 240 may be connected through the space under the valve 240 to the water-outlet nozzle 210. Further, additional components may be provided under the valve 240. In one embodiment, the valve 240 may be rotatably secured to the valve mount 251.

In one example, the valve 240 may be connected to the valve mount 251 using a hinge or the like. Due to such a configuration, the inclination angle of the valve 240 may be adjusted. In addition, fixing means for rotating the valve 240 and fixing a rotation angle thereof may be provided. Accordingly, the inclination angle of the valve 240 may be adjusted according to the size and the internal environment of the water-outlet module 200. Further, the adjusted angle may be maintained.

In another example, the valve 240 may be provided horizontally or may be arranged in the vertical direction. In one embodiment, the fixed portion 251 has a plurality of fixing pins 254 protruding downward from the bottom face thereof. A plurality of bosses 206 may be formed on an inner bottom face of the water-outlet module 200. Each boss 206 has a fixing groove 205 defined therein in which each fixing pin 254 is inserted.

Thus, as the fixing pin 254 fits into the fixing groove 205, the bracket 250 may be fixed inside the water-outlet module 200. Furthermore, the alignment of the bracket 250 may be facilitated by the engagement between the fixing pin 254 and the fixing groove 205.

In addition, the fixed portion 251 is in face contact with the inner bottom face of the water-outlet module 200. The fixed portion 251 has an up-and-down through-hole 255. Accordingly, the fixed portion 251 may be fastened to the inner bottom face of the water-outlet module 200 via a screw or a bolt or the like.

In this case, the fixed portion 251 of the bracket 250 is in face contact with the inner face of the water-outlet module 200, so that a supporting force be secured. In addition, because the face-contacted portions are fastened via the screws, bolts, etc., the fixing force may also be ensured. There is an advantage that if necessary, it is easy to separate the fixed portion from the module.

In addition, the manipulation unit 300 including a water-discharge button 310 is provided on a top face of the water-outlet module 200. According to the present disclosure, the manipulation unit 300 is formed on the top face of the water-outlet module 200. Thus, the user may easily control the overall operation of the purification device 10.

Furthermore, since the manipulation unit 300 rotates together with the water-outlet module 200 when the water-outlet module 200 is rotated, the user may control the overall operation of the purification device 10 regardless of whether the water-outlet module 200 is rotated or not.

Above the valve 240, a cable 244 and a connector 245 electrically connected to the manipulation unit 300 may extend upwardly. Since the manipulation unit 300 is provided on the top of the water-outlet module 200, the distance between the valve 240 and the manipulation unit 300 may be shortest. Accordingly, the actuation unit 243 of the valve 240 and the manipulation unit 300 are linearly connectable with each other via the cable 244. In this case, the length of the cable 244 may be kept short.

According to the present disclosure, the water-outlet module 200 may be capable of vertical movement and rotation with respect to the main body 100. To this end, the casing 220 includes a fixed casing portion 221 fixed to the main body 100, and a vertically-movable casing portion 222 provided inside or outside the fixed casing portion 221, and vertically movable while bearing against the fixed casing portion 221. The water-outlet nozzle 210 and the valve 240 are installed in the vertically-movable casing portion 222.

Accordingly, while the fixed casing portion 221 is fixed to the main body 100, the vertically-movable casing portion 222 is vertically moved while bearing against the fixed casing portion 221. At the same time, the water-outlet nozzle 210 installed in the vertically-movable casing portion 222 and the valve 240 may also be vertically moved.

In another example, the casing 220 is fixed to a rotator 400 rotatably mounted on the main body 100. Accordingly, the casing 220 is rotatable together with the rotator 400 in both directions with respect to the main body 100. At the same time, the water-outlet nozzle 210 installed in the casing 220 and the valve 240 may be rotated.

Figure 7:
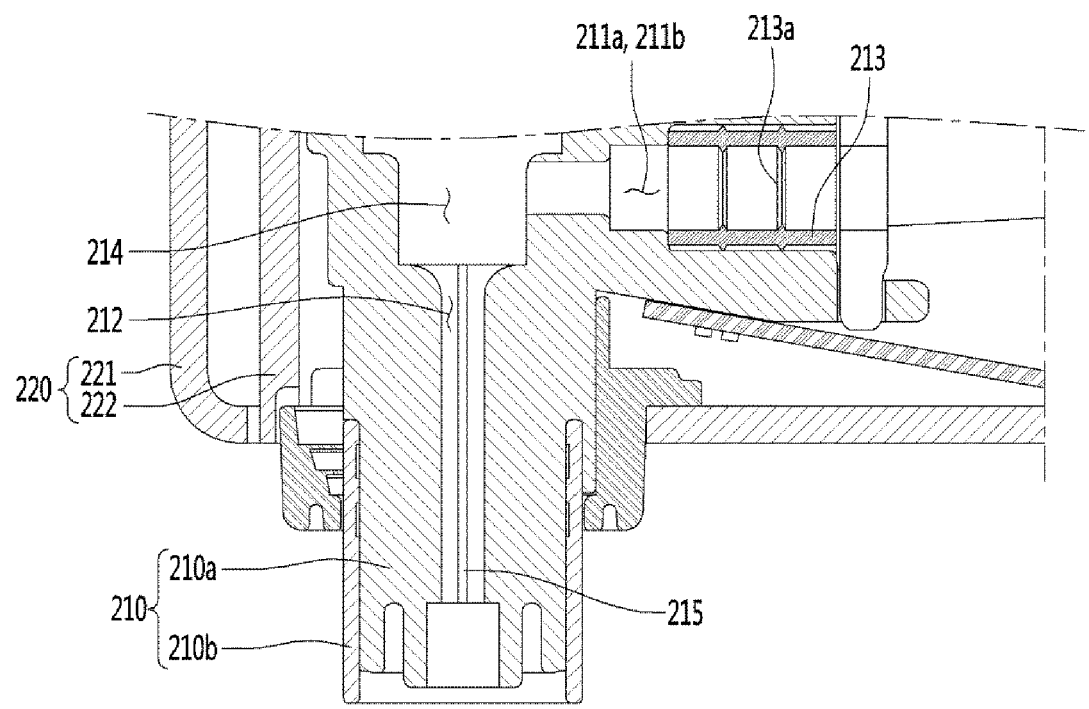
FIG. 7 is a front vertical cross-sectional view of a water-outlet nozzle as one component of the present disclosure.
Figure 8:
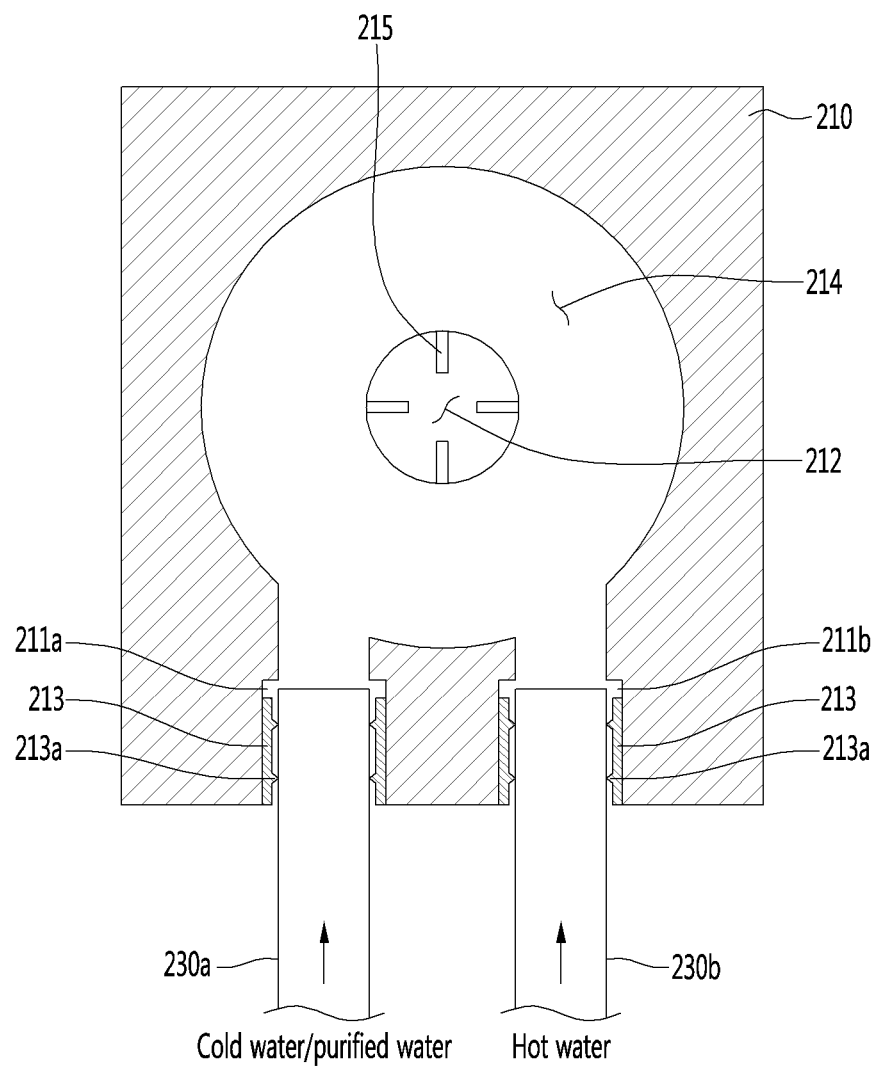
FIG. 8 is a top and horizontal cross-sectional view of the water-outlet nozzle as one component of the present disclosure.

FIG. 7 is a front and vertical cross-sectional view of the water-outlet nozzle as one component of the present disclosure. Further, FIG. 8 is a top and horizontal cross-sectional view of the water-outlet nozzle as one component of the present disclosure. Furthermore, FIG. 9 is a rear view of the water-outlet nozzle as one component of the present disclosure.

Figure 9:
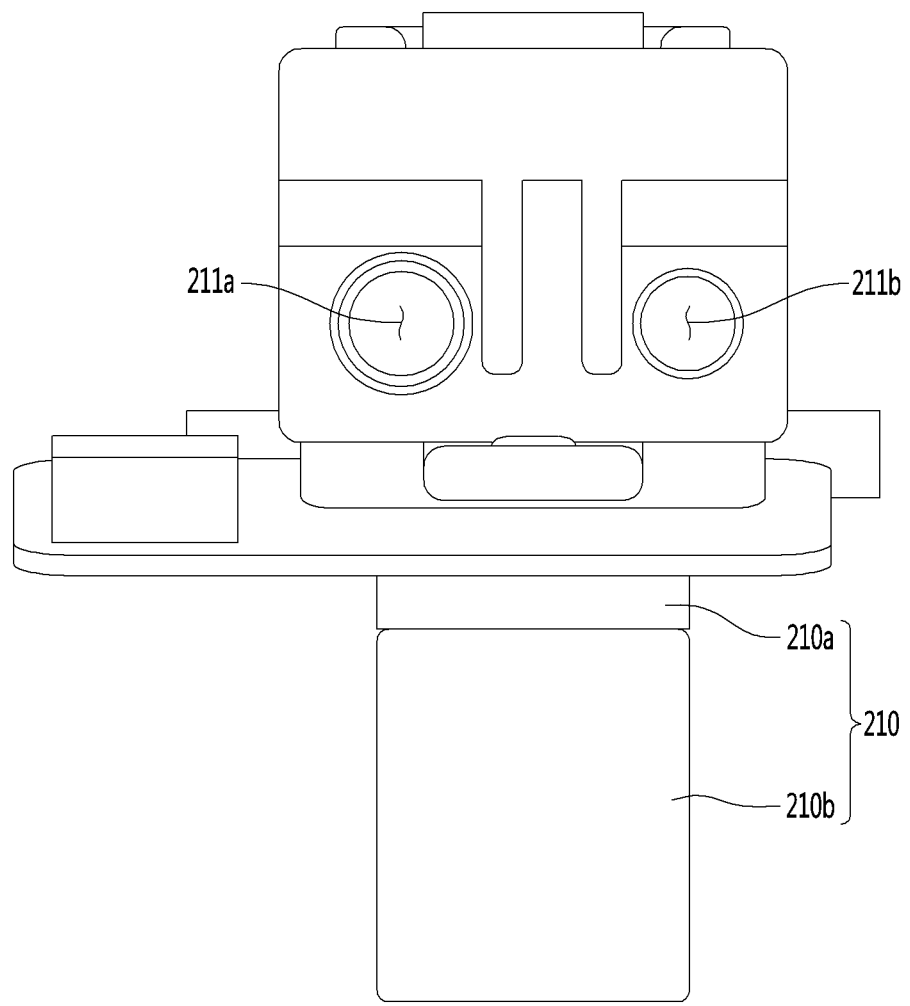
FIG. 9 is a rear view of the water-outlet nozzle as one component of the present disclosure.

Referring to FIGS. 7 to 9, in the rear end of the water-outlet nozzle 210, a hose channel 211 through which the water-supply hose 230 passes is defined in the anteroposterior direction. A water-outlet hole 212 communicating with the hose channel 211 for discharging the water introduced into the water-supply hose 230 is defined in a vertical direction in front of the channel 211. Accordingly, after water supplied from the water-supply hose 230 connected to the hose channel 211 of the water-outlet nozzle 210 is fed forwardly, water is discharged vertically downwards through the water-outlet hole 212.

In one embodiment, the hose channel 211 includes a first hose channel 211a to which a purified water-supply hose 230a for supplying purified water or cold water is connected. The hose channel 211 may include a second hose channel 211b extending in parallel with and spaced from the first hose channel 211a and connected to a hot water-supply hose 230b for supplying hot water.

In this connection, a hollow packing 213 is provided in each of the first hose channel 211a and the second hose channel 211b. Each of the purified water-supply hose 230a and the hot water-supply hose 230b may be press-fitted into a corresponding packing 213. In one example, the packing 213 may be made of a silicon material. In addition, a protrusion 213a may be formed along the circumferential direction on the inner circumferential face of the packing 213. In one example, the protrusion 213a may be provided in the form of a ring.

Due to the construction of the packing 213 having the protrusion 213a as described above, the purified water-supply hose 230a and the hot water-supply hose 230b are more firmly fixed to the first hose channel 211a and the second hose channel 211b respectively. Further, leakage between the purified water-supply hose 230a and the first hose channel 211a and leakage between the hot water-supply hose 230b and the second hose channel 211b may be prevented.

The water-outlet nozzle 210 further includes a chamber 214. The chamber 214 communicates with the front end of the hose channel 211 and communicates with the top of the water-outlet hole 212. The chamber 214 transfers the water introduced through the hose channel 211 to the water-outlet hole 212.

In one example, the chamber 214 defines a cylindrical space. The bottom of the chamber defines a first hole communicating with the water-outlet hole 212. A rear end of the chamber may define a second hole and a third hole in communication with the first hose channel 211a and the second hose channel 211b, respectively.

Therefore, both the cold water or purified water flowing through the purified water-supply hose 230a and the hot water introduced through the hot water-supply hose 230b are combined in the chamber 214. Alternatively, when the cold water or purified water introduced through the purified water-supply hose 230a and the hot water introduced through the hot water-supply hose 230b are not joined together in the chamber 214, the cold water or purified water introduced through the purified water-supply hose 230a and the hot water introduced through the hot water-supply hose 230b may be supplied via the chamber 214 through the water-outlet hole 212 to the outside of the hole 212.

In addition, the water-outlet nozzle 210 may include an inner member 210a having the water-outlet hole 212 and the chamber 214 defined therein, and an outer member 210b connected to an outer lower face of the inner member 210a and exposed to the outside of the casing 220. In this connection, the inner member 210a and the outer member 210b may be integrally injection-molded.

In this connection, the outer member 210b may be made of a metal material. The inner member 210a and the outer member 210b may be integrally formed by an insert injection method. Accordingly, the coupling force between the inner member 210a and the outer member 210b increases, thereby preventing water leakage. In addition, this configuration may be easier to manufacture than when using a conventional assembly method.

In this connection, in order to improve the coupling force between the inner member 210a and the outer member 210b, a protrusion is formed on the outer circumferential face of the inner member 210a, while the inner circumferential face of the outer member 210b has a groove defined therein into which the protrusion is fitted.

In addition, the outer member 210b may be made of stainless steel. When the outer member 210b exposed to the outside of the casing 220 is made of stainless steel as described above, the member 210b is sanitary because the member does not rust. Further, breakage and deformation otherwise occurring during frequent use of the member may be prevented. Moreover, the appearance of the purification device 10 becomes more beautiful. The purification device 10 may have a luxurious image.

A plurality of ribs 215 protruding inwardly from the inner face of the inner member 210a defining the water-outlet hole 212 may be formed in the vertical direction (discharge direction). The ribs 215 may shape the water stream into a linear shape, remove the vortex, and the like.

Hereinafter, the water discharge process of the purification device according to an embodiment of the present disclosure having the above structure will be described. FIG. 10 is a schematic view showing a flow path of water of the purification device. As shown in FIG. 10, an inlet pipe 11 of the purification device 10 is connected to a water source (for example, a water tap) and receives raw water. The inlet pipe 11 is connected to a pressure-reducing valve 12. The raw-water passing through the pressure-reducing valve 12 is depressurized to a pressure set for the operation of the purification device 10.

Further, the decompressed raw-water flows to the filter 120 along a pipe connecting the pressure-reducing valve 12 and the filter 120. Foreign matters may be removed from the raw water while passing through the filter 120 to generate purified water. Further, opening a water-supply valve 13 may allow the purified water to pass through the water-supply valve 13 and through the flow-rate sensor 14 in turn.

In this connection, the water-supply valve 13 and the flow-rate sensor 14 may be connected to a main PCB (not shown) included in the control assembly 180. The opening degree of the water-supply valve 13 may be adjusted based on a signal transmitted from the main PCB (not shown). Further, the flow rate sensed by the flow-rate sensor 14 may be transferred to the main PCB (not shown) and may be used as data necessary for controlling the purification device. The purified water having passed through the flow-rate sensor 14 may be branched through a branching pipe 15 into a cold purified-water pipe 15a and a hot purified-water pipe 15b.

First, the purified water flowing into the cold purified-water pipe 15a is branched into a cold water pipe 16a and a purified water pipe 16b via a T-shaped connector 16. The cold water pipe 16a and the purified water pipe 16b are connected to a cold water-discharge valve 17 and a purified water-discharge valve 18, respectively. The purified water-discharge valve 18 and the cold water-discharge valve 17 may be connected to the main PCB (not shown) and may be opened or closed based on a signal from the PCB. That is, either the purified water-discharge valve 18 or the cold water-discharge valve 17 may be selected by user input. Manipulation of the water-discharge button 310 allows the selected valve to be opened, allowing water to be discharged.

In one embodiment, water passing through the cold water-discharge valve 17 passes through a cooling coil inside the cooling tank 150. The water flowing along the cooling coil is heat-exchanged with the cooling water inside the cooling tank 150 and is thereby cooled. To this end, the cooling water is cooled to maintain the set temperature.

In order to cool the cooling water, a compressor 141 connected to the main PCB (not shown) is driven. The compressor 141 may be driven by a cold water temperature sensor provided inside the cooling tank 150. Therefore, the cooling water may be maintained at a predetermined temperature. For this purpose, the driving of the compressor 141 may be controlled. The compressor 141 may be implemented as an inverter type compressor to adjust the frequency thereof based on the required load. Thereby, the cooling ability may be adjusted. That is, the compressor 141 may be driven by inverter control. Thus, the cooling water can be cooled at an optimum efficiency.

In one embodiment, the user may manipulate the manipulation unit 300 to forcibly set the actuation of the compressor 141 to the off state. When cold water consumption is low or when power saving is required, or when cold water is not desired, the user may force the compressor 141 to remain off.

In addition, the main PCB (not shown) may be configured to control driving of the compressor 141 and driving of the cooling fan 143. Further, the main PCB (not shown) may control driving of an agitator motor provided in the cooling tank 150. The motor is driven to increase heat exchange efficiency between cooling water and cold water passing through the cooling coil. The motor is controlled by the main PCB (not shown). The agitator is rotated by driving the motor. The cooling water may have forcedly convection movement inside the cooling tank 150. As a result, the purified water inside the cooling coil is effectively cooled.

The cold water passing through the cooling tank 150 flows into the purified water-supply hose 230a via the T connector 19. Water may then be discharged to the outside through the water-outlet nozzle 210 via the purified water-supply hose 230a. In one embodiment, when the purified water-discharge valve 18 is opened, the purified water having passed through the purified water-discharge valve 18 flows into the purified water-supply hose 230a through the T connector 19. Subsequently, water may be discharged to the outside through the purified water-supply hose 230a through the water-outlet nozzle 210.

In one embodiment, when the user selects the discharge of hot water, the purified water may flow to the hot purified-water pipe 15b branched from the branching pipe 15. A flow rate adjustment valve 20 is opened by the control of the main PCB (not shown). Thus, the water flowing through the flow rate adjustment valve 20 is adjusted to an appropriate flow rate for heating the hot water. That is, the amount of purified water to be supplied to the hot water tank pipe of the induction heating assembly 170 is adjusted such that water is heated to a temperature set by the induction heating assembly 170.

The purified water passing through the flow rate adjustment valve 20 passes through the hot water tank. Further, water may be heated to a predetermined temperature via the process passing through the hot water tank. The hot water tank may be heated by induction heating. To this end, an output of the magnetic force of the working coil may be adjusted by controlling an induction heating PCB.

In order to drive the induction heating assembly 170, a higher voltage is required than a voltage used in a main PCB. For this high voltage supply, power is supplied from a power supply PCB connected to the power supply line. The power supply PCB supplies appropriate power based on whether to drive the induction heating assembly 170. At the same time, the main PCB is supplied with an appropriate power.

Driving the induction heating assembly 170 may allow water in the hot water tank to be heated to a predetermined temperature. When the hot water valve 240 installed in the water-outlet module 200 is opened, hot water heated while passing through the hot water tank may flow to the water-outlet nozzle 210 through the hot water-supply hose 230b and may be discharged to the outside.

According to the present disclosure, the hot water valve 240 is installed inside the water-outlet module 200 so as be closer to the water-outlet nozzle 210. When, as described above, when the hot water valve 240 for controlling the flow of hot water is installed inside the casing 220 of the water-outlet module 200, the hot water flow path distance is kept to a minimum, thereby minimizing the temperature loss of the hot water during hot water discharge.

In addition, the hot water valve 240 is provided near the water-outlet nozzle 210, whereby the length of the water travel path between the hot water valve 240 and the water-outlet nozzle 210 is significantly reduced. Thus, the supply of water may be performed more quickly in a manner corresponding to the reduced length. As a result, the user may use the water-outlet nozzle 210 to discharge hot water more quickly than in the conventional configuration.

While the present disclosure has been illustrated with reference to the accompanying drawings, it is to be understood that the present disclosure is not limited to the embodiments and drawings as disclosed in the present specification. It will be obvious that various modifications may be made by those skilled in the art within the scope of the technical idea of the present disclosure. In addition, it should be recognized that other effects from the configurations of the present disclosure should be acknowledged although the other effects is not explicitly described in the specification.

Aspects of the present disclosure provide a purification device in which a valve to control the flow of water is mounted inside the water-outlet module, thereby increasing the utilization of the inner space of the water-outlet module. In addition, aspects of the present disclosure provide a purification device in which a larger internal space of the main body may be ensured, as compared with the case where the valve is installed in the main body, thereby enabling miniaturization of the main body.

In addition, aspects of the present disclosure provide a purification device in which the valve is located closer to the water-outlet nozzle, so that the supply of purified water, hot water, and cold water may be instantaneously achieved. In addition, aspects of the present disclosure provide a purification device in which a hot water valve is installed inside the water-outlet module equipped with the water-outlet nozzle, and, thus, it is possible to minimize the temperature loss of the hot water by keeping the hot water flow path distance to a minimum at the time of hot water discharge.

In addition, aspects of the present disclosure provide a purification device in which a cold water valve is installed inside the water-outlet module equipped with the water-outlet nozzle, and, thus, the temperature loss of cold water can be minimized by keeping the hot water flow path distance to a minimum during cold water discharge. In addition, aspects of the present disclosure provide a purification device in which valve inclination may be adjusted depending on the internal environment of the water-outlet module, thereby to facilitate valve installation.

Moreover, aspects of the present disclosure provide a purification device in which the valve is oriented obliquely so that the flow of water through the valve may be executed stably in the inclined direction. Furthermore, aspects of the present disclosure provide a purification device in which a degree of bending of the water-supply hose connected to both sides of the valve may be lowered, so that the flow of water from the water-supply hose to the valve, and the flow of water from the valve to the water-supply hose may be executed stably.

In addition, aspects of the present disclosure provide a purification device in which use of a separate bracket may make it easier to install the valve into the water-outlet module. Furthermore, aspects of the present disclosure provide a purification device in which the bracket may be easily fixed inside the water-outlet module, and the alignment of the bracket may be easily performed.

In addition, aspects of the present disclosure provide a purification device in which a manipulation unit is provided above the water-outlet module such that the distance between the valve and the manipulation unit may be kept shortest. Therefore, a length of a cable connecting an actuation unit of the valve and the manipulation unit may be kept short.

In one aspect of the present disclosure, a purification device may comprise: a main body including: a housing defining an appearance of the device, and a filter provided inside the housing for filtering raw water; and a water-outlet module formed to protrude forward of the main body, wherein the water-outlet module includes a water-outlet nozzle for supplying water passing through the filter out of the main body, wherein the water-outlet module includes: a casing, wherein at least a portion of the water-outlet nozzle is mounted on a bottom of the casing so as to be exposed to an outside; a water-supply hose, wherein one end thereof is connected to an inside of the main body while the other end thereof is provided inside the casing and is connected to the water-outlet nozzle, such that at least one of purified water, hot water, and cold water generated from the main body is supplied to the water-outlet nozzle; and a valve provided within the casing, wherein the valve is provided above the water-discharge nozzle and is installed on the water-supply hose to control a flow of water through the water-supply hose.

In one implementation of the device, one end of the water-supply hose is connected to a hot water module installed inside the main body, wherein the valve serves as a hot water valve for controlling a flow of hot water supplied from the hot water module to the water-outlet nozzle. In one implementation of the device, the water-supply hose includes: a first hose for connecting the main body and the valve; and a second hose for connecting the water-outlet nozzle and the valve.

In one implementation of the device, the valve is oriented obliquely, wherein the first hose is connected to a top of the valve, while the second hose is connected to a bottom of the valve. In one implementation of the device, the device further includes a bracket for fixing the valve inside the water-outlet module.

In one implementation of the device, the valve is rotatably mounted on the valve mount. In one implementation of the device, the casing includes: a fixed casing portion fixed to the main body; and a vertically-movable casing portion provided inside or outside the fixed casing portion, wherein the vertically-movable casing portion is movable in a vertical direction while bearing against the fixed casing portion, wherein the water-outlet nozzle and the valve are installed in the vertically-movable casing portion.

In accordance with aspects of the present disclosure, a valve to control the flow of water is mounted inside the water-outlet module, thereby increasing the utilization of the inner space of the water-outlet module. In addition, in accordance with aspects of the present disclosure, a larger internal space of the main body may be ensured, as compared with the case where the valve is installed in the main body, thereby enabling miniaturization of the main body.

In addition, in accordance with aspects of the present disclosure, the valve is located closer to the water-outlet nozzle, so that the supply of purified water, hot water, and cold water may be instantaneously achieved. In addition, in accordance with aspects of the present disclosure, a hot water valve is installed inside the water-outlet module equipped with the water-outlet nozzle, and, thus, it is possible to minimize the temperature loss of the hot water by keeping the hot water flow path distance to a minimum at the time of hot water discharge. That is, there is an advantage that the user may receive hot water of high temperature more quickly.

In addition, in accordance with aspects of the present disclosure, a cold water valve is installed inside the water-outlet module equipped with the water-outlet nozzle, and, thus, the temperature loss of cold water can be minimized by keeping the hot water flow path distance to a minimum during cold water discharge. That is, there is an advantage that the user may receive cold water of low temperature more quickly.

In addition, in accordance with aspects of the present disclosure, valve inclination may be adjusted depending on the internal environment of the water-outlet module, thereby to facilitate valve installation. Moreover, in accordance with aspects of the present disclosure, the valve is oriented obliquely so that the flow of water through the valve may be executed stably in the inclined direction.

Furthermore, in accordance with aspects of the present disclosure, a degree of bending of the water-supply hose connected to both sides of the valve may be lowered, so that the flow of water from the water-supply hose to the valve, and the flow of water from the valve to the water-supply hose may be executed stably. In addition, in accordance with aspects of the present disclosure, use of a separate bracket may make it easier to install the valve into the water-outlet module.

Furthermore, in accordance with aspects of the present disclosure, the bracket may be easily fixed inside the water-outlet module, and the alignment of the bracket may be easily performed. In addition, in accordance with aspects of the present disclosure, a manipulation unit is provided above the water-outlet module such that the distance between the valve and the manipulation unit may be kept shortest. Therefore, a length of a cable connecting an actuation unit of the valve and the manipulation unit may be kept short.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the present disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
   a main body; and
   an outlet coupled to the main body, wherein the outlet includes:
      a nozzle;
      a casing, wherein the nozzle is mounted on a bottom of the casing so as to be exposed to an outside of the device;
      a hose having one end that is fluidly connected to the main body, and a second end provided inside the casing and connected to the nozzle such that the hose supplies a fluid in the main body to the nozzle; and
      a valve provided within the casing, wherein the valve is provided above the nozzle and is installed on the hose to control a flow of the fluid through the hose; and
      a bracket that fixes the valve inside the outlet, wherein the bracket includes:
         a valve mount on which the valve is mounted;
         a fixing frame provided under the valve mount and fixed on an inner bottom face of the outlet; and
         a spacer provided between the valve mount and the fixing frame to define a space between the valve mount and the fixing frame.

2. The device of claim 1, wherein the valve includes:
   an inlet fluidly connected to the main body to receive at least one of filtered fluid, heated fluid, or chilled fluid;
   an outlet fluidly connected to the nozzle to discharge filtered fluid, heated fluid, or chilled fluid received in the valve through the inlet; and
   an actuator between the inlet and the outlet to open and close a channel communicating between the inlet and the outlet.

3. The device of claim 1, wherein one end of the hose is connected to a heater installed inside the main body, and wherein the valve controls a flow of heated fluid supplied from the heater to the nozzle.

4. The device of claim 1, wherein the hose includes:
   a first hose that connects the main body and the valve; and
   a second hose that connects the nozzle and the valve.

5. The device of claim 4, wherein the valve is oriented obliquely, and wherein the first hose is connected to a top of the valve and the second hose is connected to a bottom of the valve.

6. The device of claim 1, wherein the valve is rotatably mounted on the valve mount.

7. The device of claim 1, wherein the frame has a plurality of pins projecting downward from a bottom face thereof,
wherein the outlet includes a plurality of bosses formed on an inner bottom face thereof, and
wherein each of the plurality of bosses includes a groove defined therein to receive one of the pins therein.

8. The device of claim 1, wherein the frame is in contact with the inner bottom face of the outlet, wherein the frame has a plurality of vertical through holes, and wherein the frame is fastened to the inner bottom face of the outlet via fasteners passing through the vertical through holes.

9. The device of claim 1, wherein the device further comprises a handle provided on a top face of the outlet, and wherein the handle includes a discharge button.

10. The device of claim 9, wherein the device further includes a cable and a connector provided above the valve and electrically connected to the handle.

11. The device of claim 1, wherein the casing includes:
a first cover fixed to the main body; and
a second cover provided inside or outside the first cover, wherein the second cover is movable in a vertical direction while bearing against the first cover, and
wherein the nozzle and the valve are installed in the second cover.

12. The device of claim 1, wherein the nozzle has a hose channel defined in a rear end thereof, the hose channel extending in an anteroposterior direction to receive the hose therein,
wherein the nozzle has a outlet hole defined in front of the hose channel, and
wherein the outlet hole extends in a vertical direction and communicates with the hose channel to discharge liquid introduced into the hose therethrough.

13. The device of claim 12, wherein the hose channel includes:
a first hose channel accommodating therein a first hose to supply filtered fluid or chilled fluid; and
a second hose channel accommodating therein a second hose to supply heated fluid.

14. The device of claim 12, wherein the nozzle further includes a chamber defined therein, wherein the chamber communicates with a front end of the hose channel and communicates with a top of the outlet hole, and wherein the chamber transfers liquid introduced through the hose channel to the outlet hole.

15. The device of claim 14, wherein the nozzle includes:
an inner member having the outlet hole and the chamber defined therein; and
an outer member contacting a lower outer face of the inner member and exposed to an exterior of the casing.

16. The device of claim 15, wherein the inner member and the outer member are integrally injection molded.

17. The device of claim 15, wherein the outer member is made of stainless steel.

18. The device of claim 15, wherein the nozzle includes a plurality of ribs that protrude inwardly from an inner face of the inner member defining the outlet hole and extend in a vertical direction.

* * * * *